Y2587 OR 3,794,813

United States Patent
Spetz

[11] 3,794,813
[45] Feb. 26, 1974

[54] VERIFICATION SYSTEM
[75] Inventor: William L. Spetz, Cincinnati, Ohio
[73] Assignee: The Mosler Safe Company, Hamilton, Ohio
[22] Filed: July 28, 1972
[21] Appl. No.: 276,028

[52] U.S. Cl. .......................... 235/61.7 B, 340/149 A
[51] Int. Cl. ............................ G04q 9/00, G06r 7/00
[58] Field of Search............ 340/149 A; 235/61.7 B; 178/22

[56] References Cited
UNITED STATES PATENTS

| | | | |
|---|---|---|---|
| 3,702,392 | 11/1972 | St. Jean | 235/61.7 B |
| 3,609,690 | 9/1971 | Nissman et al. | 340/149 A |
| 3,611,293 | 10/1971 | Constable et al. | 340/149 A |
| 3,657,521 | 4/1972 | Constable | 235/61.7 B |

*Primary Examiner*—Thomas A. Robinson
*Attorney, Agent, or Firm*—Wood, Herron & Evans

[57] ABSTRACT

A system for ascertaining if the user of a card, such as an identification or credit card, is the owner or is otherwise in rightful possession. The system includes a card bearing an encoded multi-digit number which is correlated in a non-mathematical fashion to another and different multi-digit number memorized and known only by the card owner, this latter number being provided the owner at the time the card is issued to him. Also included in this system is an algorithm circuit for transforming the card number to a transformed number, and a comparator for comparing the transformed number with the memorized number. The card number is entered into the system via a reader, while the memorized number is introduced via a keyboard or the like. The number transformation means includes a truth table or storage means containing a plurality of addressable locations containing random digits which bear no mathematical relatiohship to their addresses. The truth table is addressed to access random digits as many times as there are digits in the memorized number. The random digits from the truth table form the transformed number which is compared on a digit-by-digit basis with the digits of the memorized number. Only if a favorable comparison results, is the holder deemed the rightful possessor of the card.

10 Claims, 4 Drawing Figures

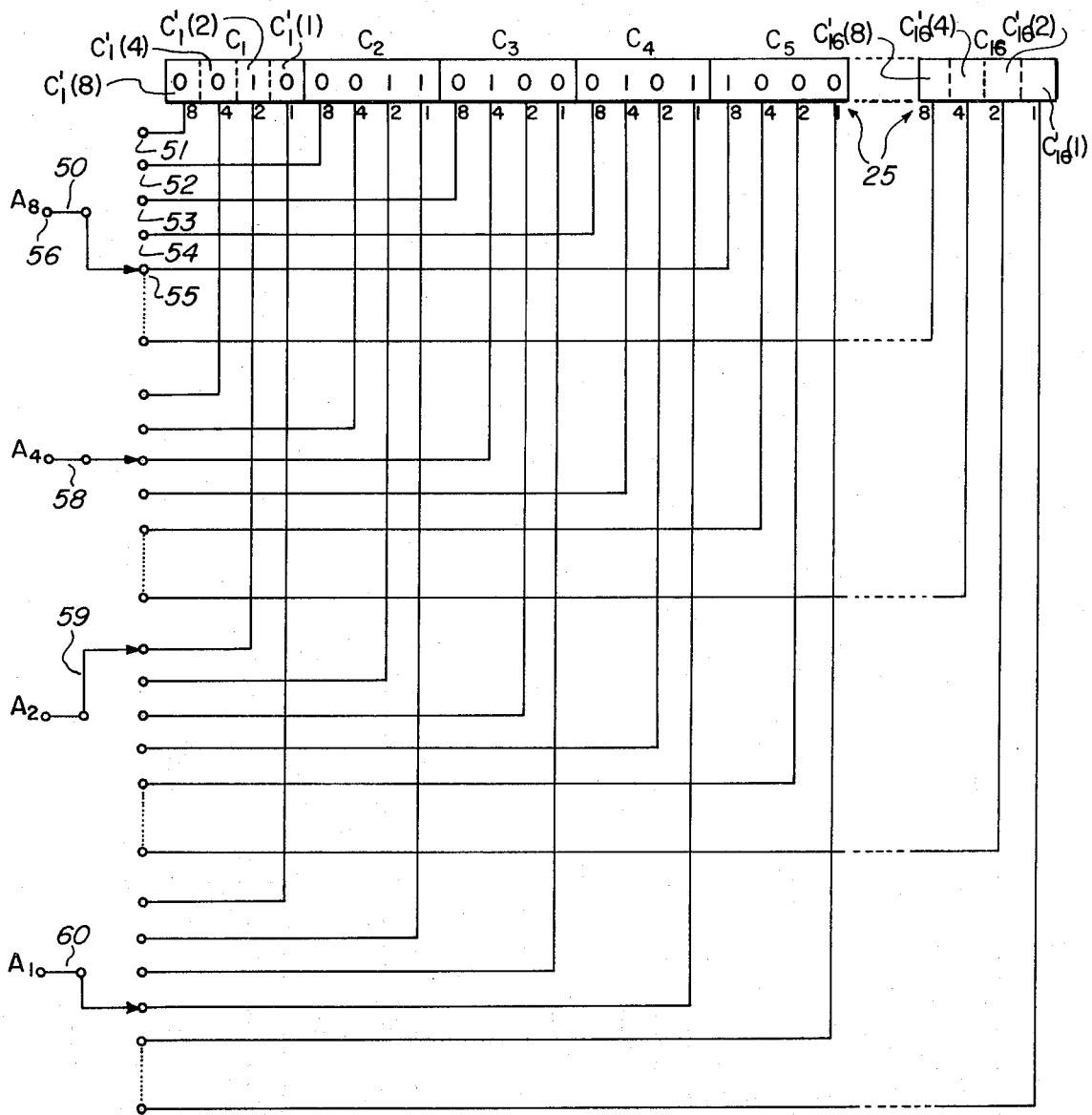
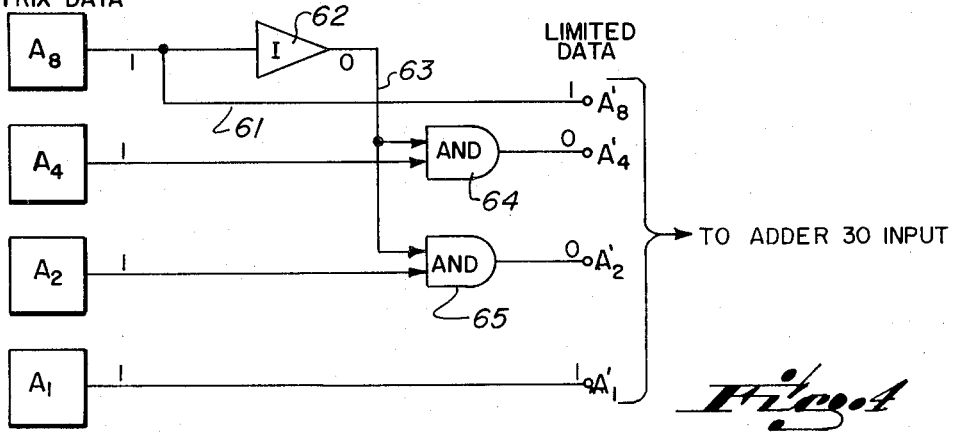

VERIFICATION SYSTEM

This invention relates generally to a verification system and particularly to secure verification systems which will correlate a memorized number, typically entered on a keyboard, with a second number read from an identification or credit card to ascertain whether the holder of the card is the rightful user.

In the banking industry, efforts have been made to improve customer service by speeding normal banking transactions as well as increasing the efficiency of banking personnel by providing automated equipment for handling routine bookkeeping activities. One of the most frequent and routine activities is obtaining cash, either by cashing a check or withdrawing from a savings account. This activity requires that a check or withdrawal slip from a customer be received and a corresponding amount of cash delivered by the teller to the customer. In some cases, it may even be necessary for the teller to determine whether there is sufficient funds in the account before he is permitted by bank regulations to give the customer the funds requested. After the funds have been delivered to the customer, the check or withdrawal slip must then be delivered to the accounting department and processed so that the customer's account will be properly debited.

The foregoing operations for obtaining cash require human intervention of a teller. This increases the cost of doing business, and accordingly efforts have been made to automate these types of cash transactions. In fact, automated machinery has been proposed to permit a customer to withdraw funds from his account without requiring the manual intervention of a teller. These systems typically employ a credit card or some other identification means having an account number and other required data contained on the card such as card expiration date, etc. To use the equipment, a customer inserts the card into the mechanism and via keys on the unit, informs the system of the desired transaction, which then executes it.

Typically, the automatic mechanisms heretofore proposed make certain checks on the data contained on the card such as determining that the card has not expired, and may also make certain checks of an accounting nature, e.g., ascertaining account balance, before delivering the money requested. Since a teller is not needed, a cost saving is realized. A further saving is realized by tying the cash dispensing equipment to the bank's central accounting system. In this way all the accounting activities associated with the cash withdrawal are handled automatically and without any human intervention.

The chief obstacle to automated banking systems of the character described has been system security. Frequently, a customer may have a wallet or purse, which contains his bank credit card, lost or stolen. If a thief or finder can present the stolen or found card to the automatic equipment, and the apparatus is unable to determine whether the person possessing the card is an authorized user, or an unauthorized thief or finder, cash is dispensed to the thief or finder and a loss occurs. To overcome this difficulty, it has been suggested to generate a number from the account or other data on the credit card. This number is generated by scrambling, i.e., rearranging, card data or by performing certain arithmetic operations on the card data. The number generated from the card data is then compared to a secret number entered on a keyboard by the customer. Each customer with such a banking credit card at the time the card is issued is given a secret number to memorize which he must enter into the keyboard each time he uses the card. The keyboard-entered memorized number is then compared to the machine generated number derived from the card data to determine their relation. If these two numbers are equal, or otherwise properly correlated, the system assumes that the person presenting the credit card is the person to whom the card was issued because a secret number properly correlated to the card data has been entered on the keyboard.

Although the approach of entering a memorized secret number on a keyboard and comparing that number with a number generated from the card itself has provided some measure of security, systems of this character have not completely avoided the risk of unauthorized withdrawals from automatic banking equipment. The principal reason for this lack of security has been the failure of the verification system to provide a sufficiently difficult or unbreakable code to prevent unauthorized persons from determining, from the credit card, the secret number associated with it. An unauthorized person can always obtain a credit card for a given bank; in fact, such can be done legitimately by opening an account. Since the unauthorized person, upon opening an account, is given a secret number corresponding to the number data on his card, the person intent on compromising the system need only determine the code relationship correlating the secret number with that on his card. Assuming the code relationship is determined, by making credit cards for other accounts and entering determinable secret numbers associated therewith, it is possible to secure funds in an unauthorized fashion.

The ease of compromising a system is enhanced if the correlation between secret numbers and card data is readily ascertainable. In some of the systems proposed heretofore, determining a secret number from a card number is readily done since the scheme correlating the numbers is such that changing a single digit in a card number produces a change of only a single digit in the corresponding secret number. Similarly, in other systems heretofore proposed, the spectral density of the generated secret numbers is actually degraded from the spectral density of the multi-digit number on the customer card. In other words, if the set of multi-digit card numbers assigned for use with a verification system is random, the secret number coder generates non-random secret numbers. Consequently, such prior art systems have a given secret number associated with many card numbers within the set of assigned card numbers making the correlation between secret numbers and card numbers more easily ascertainable.

While the foregoing cardholder verification systems have been described for automated banking applications, such verification systems have application in other environments. For example, such verification systems have application in non-bank dispensers which dispense articles other than money. In addition, verification systems of the type described have application in the area of access control for preventing unauthorized entry into secured areas such as manufacturing plants, government installations, bank vaults, or the like. In certain computer programming applications, verification of the type described may also be of value to prevent an unauthorized user in a time-sharing system from gaining access to secret information of others which may be stored in a computer memory shared by all users. There is need for verification techniques in secure communication networks to prevent unauthorized communications between two remotely located communications terminals.

It is a primary object of this invention to provide a verification system in which the relationship between all card numbers of a system and their associated memorized secret numbers is extremely difficult, if not impossible, to ascertain by comparing the data from a limited number of cards with known memorized numbers associated therewith.

This objective has been accomplished by correlating the card numbers and memorized numbers in an arbitrary manner such that the digits of one, e.g., the memorized number digits, bear no fixed logical, mathematical, arithmetical, or positional relationship to digits of the other, e.g., the card number digits. In accordance with a preferred embodiment of this invention, an arbitrary relationship between digits of card and memorized numbers is accomplished by providing a truth table or storage means containing an assemblage of random digits each of which is addressable. The digits of the card number are successively operated upon to generate a succession of addresses, which addresses are then used to successively access the truth table and generate, or derive, a sequence of random digits forming a transformed number. The random digits of the transformed number are then compared on a digit-by-digit basis with the digits of the memorized number provided the card owner at the time the card was issued. A favorable comparison indicates proper ownership or possession.

An advantage of this invention is that if the system is being compromised by a person who has learned the contents of the truth table by, e.g., stealing it from the bank, or bribing a bank employee, the system owner, such as the bank, can, by merely changing the truth table, change the memorized numbers which must be correlated with the card numbers to produce verification. Alternatively, by changing the manner in which the card digits are operated upon to generate the truth table addresses, the memorized numbers which must be correlated with the card numbers to produce verification may be altered. This effectively destroys the ability of the old memorized numbers to produce a favorable comparison with the numbers on the card and hence obtain verification, when the former are keyed into the machine in an effort to obtain a withdrawal. Thus, the truth table change renders useless the cards possessed by the unauthorized user.

A further advantage of this invention is that the spectral density of the memorized numbers is never lower than the spectral density of the correlated assigned card numbers. As such, the probability of an unauthorized person compromising the system is greatly reduced.

The above and other objects, features, and advantages of the present invention will become more clear from the following detailed description of a preferred embodiment taken in connection with the drawings which form a part of the original disclosure wherein:

FIG. 3 is a detailed drawing of a portion of a matrix switch shown in FIG. 2; and FIG. 4 shows one possible number limiting circuit configuration for converting binary numbers into binary coded decimal numbers.

GENERAL DESCRIPTION

Figure 1:
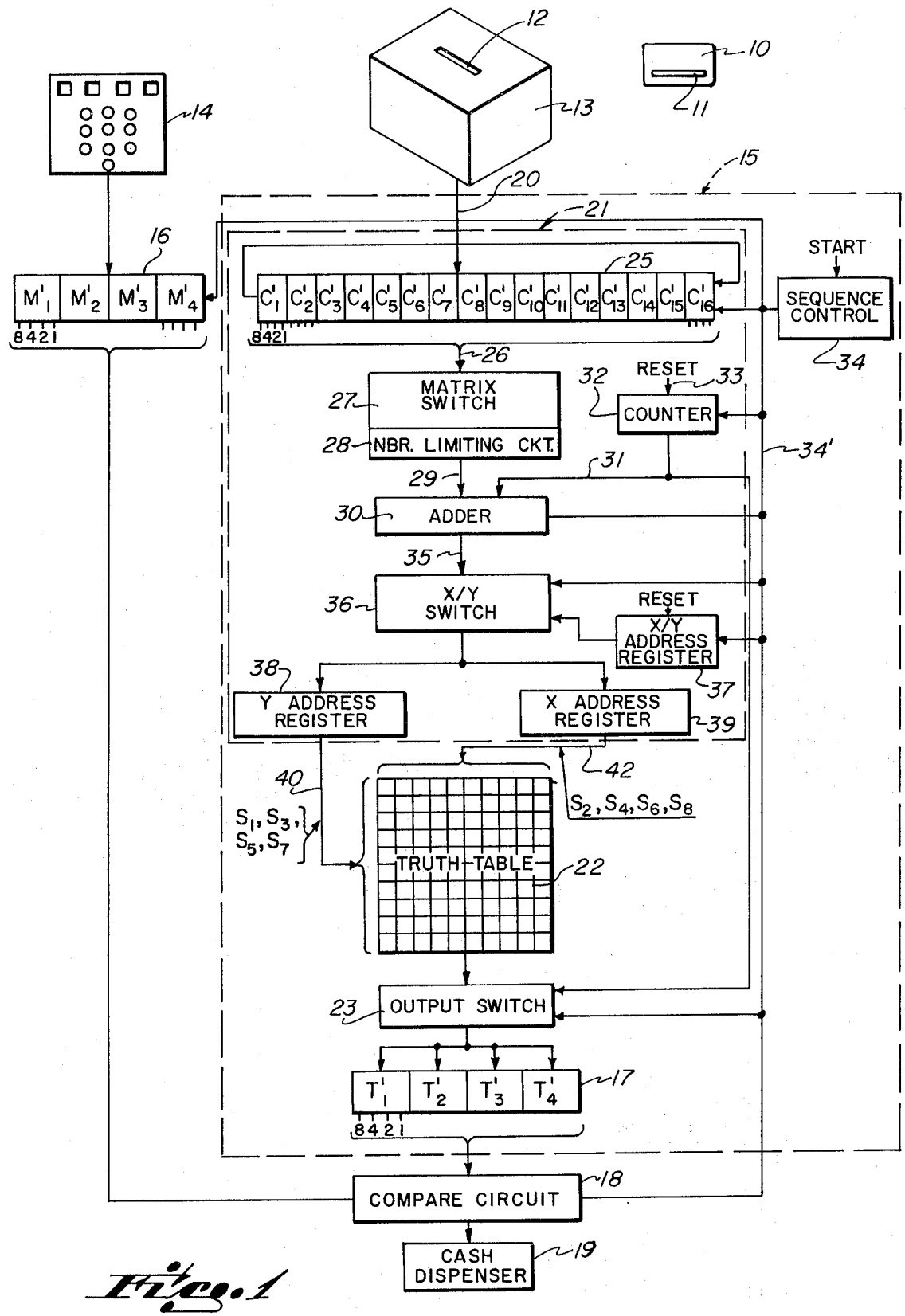
FIG. 1 is a schematic diagram showing the functional elements for one system implementation.

In a preferred embodiment of the present invention shown in FIG. 1, a customer is provided with a card 10 having a card number encoded thereon along an information bearing strip 11. At the time of issuance of the card to the customer, the customer is given a secret number to be memorized and used with the card. The customer uses the verification system by inserting the card 10 into a slot 12 of a card reader 13 and also entering the memorized number on a keyboard 14. The number encoded on the customer card 10 is read by the card reader 13 and transmitted to a card number transforming network 15. The memorized number entered on the keyboard 14 is stored in a register 16. The transforming network 15 transforms the card number $C_1, C_2, \ldots C_{16}$, in accordance with the number transformation method of this invention, into a four decimal digit transformed number $T_1, T_2, \ldots T_4$ which has no logical, mathematical, arithmetical, or positional relationship with respect to the card number. The transformed number is temporarily stored in a register 17 and then compared with the memorized number stored in the register 16 by a comparing circuit 18. If there is a favorable comparison between these numbers, the verification system will produce a verification signal indicating that the customer has entered the memorized number given to him when the card was issued, and accordingly is an authorized user. This verification signal is input to a utilization device, such as a cash storage and dispensing unit 19, which then dispenses to the verified card holder the cash requested.

DETAILED DESCRIPTION

In greater detail, one preferred embodiment of the present invention includes a credit card 10 which is issued to a customer for use with a credit card operated cash dispenser 19. The credit card 10 contains certain information, such as an account number, which is encoded on the information-bearing strip 11 in the form of embossments, magnetic recording or other machine readable form. For purposes of illustration, it is assumed that the card 10 has stored thereon along strip 11 a 16 digit decimal number, the digits $C_1, C_2, \ldots C_{16}$ of which are represented in binary-coded-decimal format. It is also assumed that at the time the card 10 is issued to the owner, a secret identification number, to be memorized by the owner, is also issued. The memorized number is a four digit decimal number $M_1, M_2, \ldots M_4$ and is related to the card number $C_1, C_2, \ldots C_{16}$ in a unique manner in accordance with the number transformation operation and method of this invention. The holder of a card is only verified, i.e., deemed to be the owner, if the memorized number $M_1, M_2, \ldots M_4$ and card number $C_1, C_2, \ldots C_{16}$, following conversion of the card number to the transformed number $T_1, T_2, \ldots T_4$ by the transformation technique of this invention, result in a favorable comparison.

In normal operation, the credit card 10 is inserted by the customer into a credit card receiving slot 12 in the credit card reader 13. The credit card reader 13 may be of any type well known in the art. The card data, or at least certain portions of it, is read by the card reader 13 and input to the transforming network 15 via line 20. After inserting the card 10 into the card reader 13, the customer then enters the memorized number $M_1$, $M_2, ... M_4$ into the keyboard 14 which generates binary-coded-decimal signals representing the memorized number and transmits these signals to a register 16. For purposes of illustration, register 16 is shown having four memorized number digit storing locations labelled $M_1'$, $M_2'$, $M_3'$ and $M_4'$ for storing, in binary-coded-decimal (BCD) format, the entered memorized number $M_1, M_2, ... M_4$ received from the keyboard 14. Since storage of digits $M_1, M_2, ... M_4$ in locations $M_1', M_2', ... M_4'$ is in BCD format, each storage location stores four bits having positional values of 8, 4, 2 and 1 in accordance with well known BCD coding techniques.

After entering the transforming network 15, the card data is first used by an address generating network 21 to produce truth table or storage addresses. These truth table addresses are used to address a truth table or storage means 22 which comprises a plurality of addressable storage locations, each location having a random number stored therein binary-coded-decimal format and which has no relationship to the address where the random number is stored. The truth table 22 is addressed by the address generating network 21 as many times as there are digits $M_1, M_2, ... M_4$ in the memorized number. Thus, for a four digit memorized number $M_1, M_2, ... M_4$ four truth table addresses are successively generated. Each time the truth table 22 is addressed, a random BCD number $T_1, T_2, ... T_4$ is outputed and directed by an output switch 23 to a unique digit position $T_1', T_2', ... T_4'$ in the transformed number register 17. Since transform digits $T_1, T_2, ... T_4$ are stored in BCD format, each register positions $T_1', T_2', ... T_4'$ stores four binary bits having positional values of 8, 4, 2 and 1 in accordance with well known BCD coding techniques. After all the transformed number digits $T_1, T_2, T_3$ and $T_4$ are assembled in the transformed number register 17, these numbers are compared in a comparing circuit 18 with the memorized number $M_1, M_2, ... M_4$ stored in register 16. As noted earlier, a favorable comparison indicates that the entered memorized number is the same memorized number issued to the card owner at the time the card was issued. Presumably, the person entering the card and the memorized number is the owner or a person authorized by the owner to use the card.

In the preferred embodiment, the address generating network 21 of transformation circuit 15 includes a shift register 25 operably connected to line 20 for receiving card number $C_1, C_2, ... C_{16}$ in BCD format from the card reader 13. For the illustrative card number $C_1, C_2, ... C_{16}$ selected by way of an example, 16 binary-coded-decimal digits are transmitted over line 20 to the shift register 25 each time a card is inserted into the card reader. The 16 card number digits $C_1, C_2, ... C_{16}$ are stored in 16 shift register digit positions $C_1', C_2', ...$ and $C_{16}'$, respectively, with each register digit position comprising four binary bit storage positions to accommodate the four BCD bits having positional values of 8, 4, 2 and 1. Since the decimal card number $C_1, C_2, ... C_{16}$ stored in the shift register 25 is stored in conventional BCD notation, the shift register 25 has 64 binary storage positions. Preferably register 25 is an end-around shift register which shifts, during each shifting operation, all the decimal digits $C_1, C_2, ... C_{16}$ stored therein in one direction by three decimal digit positions (12 binary bit positions), with the decimal digits shifted out of one end of the shift register 25 being input to digit positions at the other end of the shift register 25. By way of example, and assuming each shift operation shifts the card number digits left by three decimal digit positions, three high order decimal digits $C_1, C_2, C_3$ stored in the leftmost decimal digit storage positions $C_1', C_2'$ and $C_3'$ are spilled out of the left side of the shift register 25 and placed in the rightmost storage locations $C_{14}', C_{15}'$ and $C_{16}'$, respectively, so that the card number digits $C_1, C_2, ... C_{16}$, after the first shifting operation, are rearranged in the shift register 25 from left to right as shown below:

$C_4, C_5, ... C_{15}, C_{16}, C_1, C_2, C_3$. While a left end-around shift register has been described, the shift register 25 may take the form of a right end-around shift register or any other form of shift register which will permit the shifting of the card number $C_1, C_2, ... C_{16}$ to different positions from those originally occupied when the card number is read and entered into the shift register 25.

Furthermore, while it is preferred to have the shift register 25 move the card number digits $C_1, C_2, ... C_{16}$ by three digit positions each shifting operation, the card number decimal digits and/or BCD binary bits can be shifted by other amounts. For reasons to be evident later, the shifting operation is performed seven times in the course of transforming card number $C_1, C_2, ... C_{16}$ to transform number $T_1, T_2, ... T_4$.

The 64 binary bit positions $C_1'(8, 4, 2, 1), C_2'(8, 4, 2, 1), ... C_{16}'(8, 4, 2, 1)$ in the shift register 25 are connected by a plurality of data lines 26 to a matrix switch 27. The matrix switch 27 includes a plurality of switching elements for sampling individual binary bit positions $C_1'(8), C_1'(4), ... C_{16}'(2), C_{16}'(1)$ of register 25 to produce a plurality of binary coded digits which form the input for a number limiting circuit 28. The output of the number limiting circuit 28 is transmitted over data lines 29 to an adder 30. The matrix switch 27 comprises a plurality of switching decks and, in a preferred embodiment, there are five decks labeled A, B, C, D and E. Each switch deck is used to generate a binary coded digit with four binary bit positions to each digit. For example, the A switch deck produces a digit A with four bit positions labeled $A_8, A_4, A_2$ and $A_1$. Each switch deck output bit position $A_8, A_4, A_2, A_1 ... E_8, E_4, E_2, E_1$ is connected to one of the binary bit positions $C_1'(8), C_1'(4), ... C_{16}'(2), C_{16}'(1)$ in the shift register 25 via a settable rotary switch element or the like.

Since the data output from each switch deck A, B, C, D and E is in pure binary form, and could have a decimal value up to 15, and further since subsequent processing of this number is done with a decimal adder having maximum digit values of only 9, each switch deck output digit must pass through a number limiting circuit 28 to change each switching deck output from a pure binary format number with a maximum decimal value of 15, into a BCD format number with a maximum value of 9. All of the BCD numbers, of which there are eight for reasons to be evident later, produced by the five switching decks A, B, ... E, following conversion from pure binary to BCD and limited in value to 9 by the number limiting circuit 28, are entered into the adder 30. The adder 30 adds the five binary-coded-decimal numbers from the number limiting circuit, and additionally has an input for receiving data from lines 31 that carry signals representing binary data from a binary counter 32. This binary counter 32 has two bit positions and has a reset input 33 so that the counter can be, when desired, reset to all 0's. The counter 32 is incremented by a sequence controller 34, described in greater detail later, which provides, among other things, clock or gating signals to the counter 32 for incrementing the counter at the proper time. The binary data in the counter 32 is added to the data from the number limiting circuit 28 by the adder 30 to produce at the adder output data line 35 a sum. The sum produced by decimal adder 30 is in BCD form, and has only one decimal digit output therefrom with a maximum value of 9 since all carries generated by the adder are ignored. For reasons to become apparent hereinafter, adder 30 produces eight sums $S_1$, $S_2$, ... $S_8$ in the course of transforming card number $C_1$, $C_2$, ... $C_{16}$ to transformed number $T_1$, $T_2$, ... $T_4$.

An X/Y switch 36 is provided which comprises several AND circuit gates which are controlled by the X/Y address register 37 for sequentially gating the sums $S_1$, $S_2$, ... $S_8$ generated by the adder 30 alternately to the X and the Y address registers. When the register 37 is in its X condition, the X/Y switch 36 will cause the switch 36 to gate the sums generated by the adder 30 to the X address register 39. When the register 37 is set to its Y setting, however, the sums S generated by the adder 30 are transmitted via switch 36 to the Y address register 38. Since X/Y switch 36 alternates between its X and Y conditions, sums $S_1$, $S_3$, $S_5$ and $S_7$ are gated to the X register 39, while sums $S_2$, $S_4$, $S_6$ and $S_8$ are gated to Y register 38. The X/Y register 37 is also controlled by signals from the sequence control unit 34 in accordance with a control sequence described later.

The sums $S_1$, $S_3$, $S_5$ and $S_7$ in the X address register 39 are transmitted over the X addressing lines 40 to form a first part of a truth table address. The sums $S_2$, $S_4$, $S_6$ and $S_8$ in the Y address register 38 are transmitted over Y addressing lines 42 to the truth table 22 and form a second part of a truth table address. Sums $S_1$ and $S_2$, $S_3$ and $S_4$, $S_5$ and $S_6$, and $S_7$ and $S_8$ constitute four address pairs for accessing truth table 22 to produce four transform digits $T_1$, $T_2$, . . . $T_4$. Since the sums $S_1$, $S_2$, ... $S_8$ on the addressing lines 40 and 42 are decimal in the preferred embodiment of the present invention, and since two sums S are used in accessing the truth table 40 to produce a single transform digit T, truth table or storage means 22 is provided with 100 addressable locations. The truth table 22 itself may comprise any suitable means for storing, at addressable locations, random digits, such as digits from a random number table. For example, the truth table 22 may take the form of a read only, solid state, computer core memory in which the 100 storage locations are arranged in a 10×10 X-Y matrix. Each storage location contains a random digit in BCD format and is addressable with X and Y coordinates in the form of sum pairs $S_1$, $S_2$; $S_3$, $S_4$; $S_5$, $S_6$; and $S_7$, $S_8$.

When the truth table 22 is addressed by X-Y coordinate addresses in the X and Y address registers, the data output from the truth table 22, which is from the storage location at the intersection of the X-Y coordinate addresses and preferably in BCD form, although binary or other numbers can be used, is directed by the output switch 23 to the transformed number register 17 in accordance with the setting of the counter 32. The output switch 23 comprises a plurality of AND gates or the like which are controlled by the numerical value stored in the counter 32. The switch 23 is operably connected between the truth table and the transformed number register 17 for gating the truth table output to one of the transformed number register 17 digit positions $T_1'$, $T_2'$, $T_3'$, or $T_4'$. For example, when the counter 32 is set to zero, the output of the truth table 22 is gated by the output switch 23 to the $T_1'$ digit position of the transformed number register 17. Likewise, when the counter is set to a one, two or three, the output of the truth table is gated by the output switch 23 to the $T_2'$, $T_3'$ or $T_4'$ transformed number digit positions in register 17.

Figure 2:
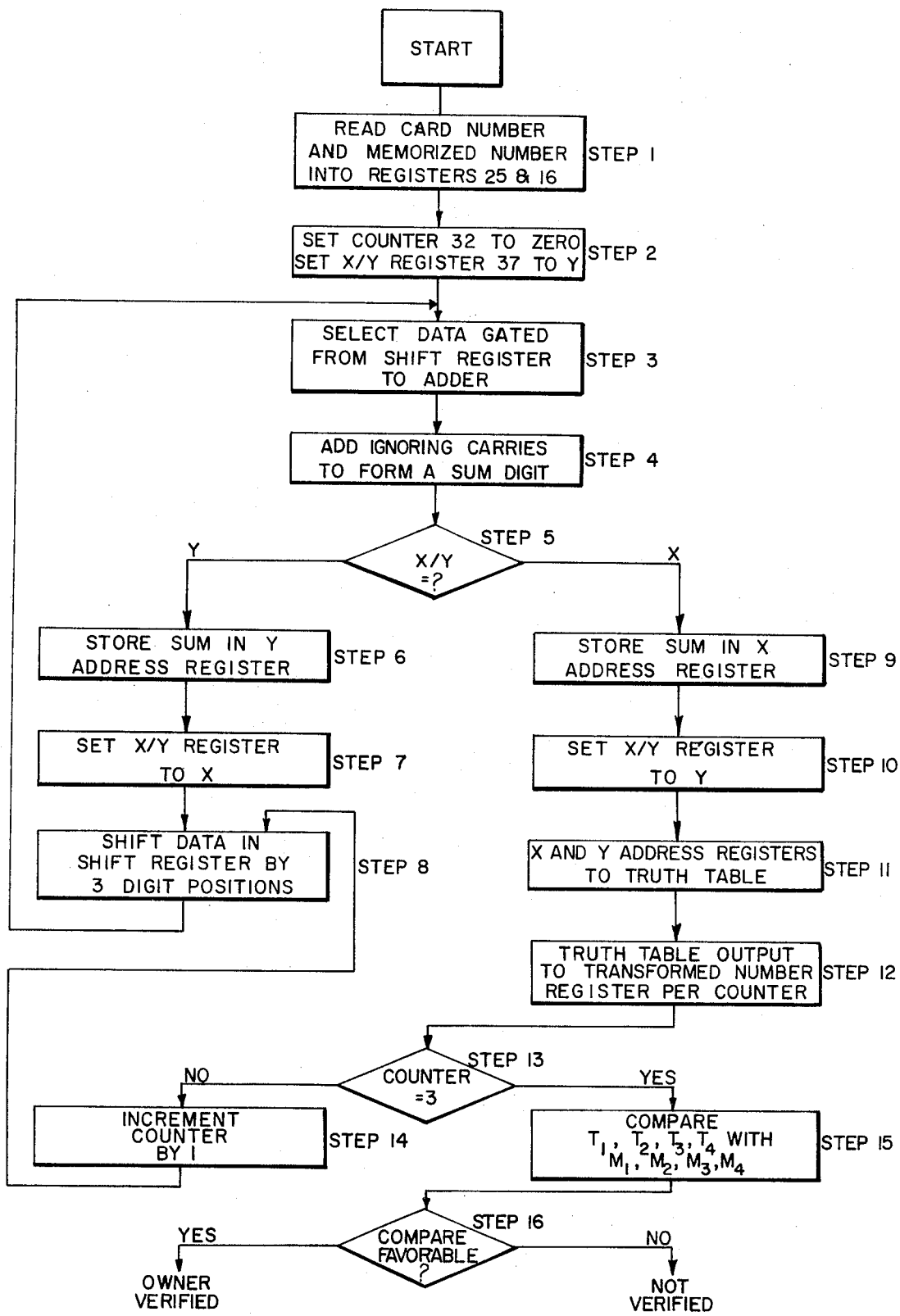
FIG. 2 is a flow chart for the operation of the system of FIG. 1.

For cash dispensing operations of the type generally described earlier, the verification network shown in FIG. 1 operates in a manner described in part by the flow chart in FIG. 2. After a cash dispensing system has been installed in a bank or other facility using a verification system of the present invention, the bank assigns a set of card numbers for the customers authorized to use the system. As each card number is assigned to a customer, the customer is given a secret number which he is asked to memorize. For the system described in FIG. 1, the card numbers comprise a 16 digit decimal number placed on the card in some machine readable form. Each authorized customer is given a four digit decimal number for use with his card in the verification system. While the preferred system uses 16 digit decimal card numbers and four digit decimal memorized numbers, it will be recognized by those skilled in the art that the card numbers and the memorized numbers may also comprise more or less digits and may also include alphabetical or symbol data as well.

The customer who desires to receive cash from a cash dispenser 19 inserts his card 10 into the card reader 13 and also keys the memorized number in the system keyboard 14. After these manual operations have been concluded, the verification system of FIG. 1 automatically determines whether the proper memorized number has been entered into the keyboard 14 for the particular card 10 inserted into the card reader 13. The automatic operations of the system in FIG. 1 are described by the flow chart in FIG. 2 and the operations indicated in the flow chart are sequentially performed under the control of the sequence controller 34, the details of which are described later. The first step of the verification method performed by the apparatus of FIG. 1 is to read the 16 digit card number from the card 10 and place the read number into the shift register 25. At the same time, the four digit memorized number is entered into the keyboard 14. At this point in time, the card number digits $C_1$–$C_{16}$ are stored in the shift register 25 and the digits of the memorized number $M_1$–$M_4$ are stored in the memorized number register 16. In the second step, counter 32 and the X/Y register 37 are reset by the sequence controller 34 so that the counter 32 is set to zero and the X/Y register 37 is set to its Y value.

After the system has been reset and the card number $C_1$–$C_{16}$ and the memorized number $M_1$–$M_4$ have been entered into the shift register 25 and memorized number register 16, respectively, the system is conditioned for generating its first truth table address. As described earlier, the truth table address is generated from the card number stored in the shift register 25. The matrix switch 27 automatically selects four binary bits from the 64 bits stored in shift register 25 for each switching deck A–E. In the preferred embodiment there are five switching decks A–E with each switch in each deck being settable by the system owner as will be described later. Each of the switching decks in Step 3 produces a digit with four binary bits and these digits are each passed through a number limiting circuit so that five magnitude-limited binary-coded-decimal digits are presented to the input of the adder 30. The counter 32, which has been set to a value of zero, is also presented to the input of the adder 30 which, during Step 4, adds in parallel all of the BCD data input to it to produce a sum output $S_1$ in the form of a single BCD digit, there being only a single digit because the carries of the high order digits are ignored by the adder.

Each sum digit $S_1$, $S_2$, ... $S_8$ formed by the adder 30, as described earlier, forms either an X or a Y address for the truth table 22. In response to the setting of the X/Y register 37, the setting of which is determined in Step 5, the sequence controller 34 in Step 6 or Step 9 alternately gates the adder sum $S_1$, $S_2$, ... $S_8$ to the Y address register 38 and the X address register 39. Since the initial setting of the X/Y register 37 is to its Y value, the sequence controller 34 stores the first sum $S_1$ output from adder 30 in the Y address register 38 as indicated in the flow chart. The sequence controller 34 in Step 7 changes the value in the X/Y register 37 to its X value in order to assure that the second sum $S_2$ generated by the adder 30 is stored in the X address register 39.

Since the matrix switch 27 samples 20 selectable binary bit positions of the 64 binary bits positions in the shift register 25, a different set of data should be sampled in order to produce a different address from that in the Y address register 38 for storage in the X address register 39. To facilitate this, the sequence controller 34, in Step 8, activates the shift register 25 to end-around shift the card number digits $C_1$–$C_{16}$ contained therein by three digit positions (12 binary bit positions). Upon completion of the shifting operation, Steps 3 and 4 are repeated and the shifted card number digits in the shift register 25 are gated through the matrix switch 27 and the number limiting circuit 28 to the adder 30 with some assurance that the second sum 52 generated by the adder 30 is different from sum $S_1$ produced in the first mentioned adding operation. As indicated by the flow chart, the shifted card data in register 25 sampled by the matrix switch 27 and limited by the number limiting circuit is added in adder 30 along with an input from counter 32, ignoring carries to form a new sum digit $S_2$. The input from counter 32 used to form X address sum $S_1$ is different from the counter input used to form Y address sum $S_2$ due to the fact that the counter 32 has been advanced by the sequence controller 34. Since the X/Y register has been set to its X value during Step 6, the sequence controller 34 in Step 9 causes the adder sum $S_2$ to be stored in the X address register 39. The sequence controller 34 in Step 10 then resets the X/Y register to its Y value.

At this time in the operation sequence, two address digits $S_1$ and $S_2$ have been generated from the card number $C_1$ – $C_{16}$ and these address digits are stored in the Y and X address registers 38 and 39. These Y and X addresses $S_1$ and $S_2$ are, in Step 11, gated by the sequence controller 34 to the truth table 22 in order to address one of the addressable coordinate locations within the truth table to produce the first transformed digit $T_1$. The truth table 22, during Step 12, operates to place the random BCD digit $T_1$ stored at the addressed location at the output thereof so that it may be stored in register position $T_1'$ in the transformed number register 17. When the random digit from the addressed truth table location is available at the truth table output, the sequence controller 34, also in Step 12, controls the output switch 23 and causes the truth table output digit $T_1$ to be gated to register position $T_1'$ of the transformed number register 17 in accordance with the numerical value stored in the counter 32. As already described, the truth table 22 contains a plurality of individually addressable locations for storing random BCD digits. The system owner normally selects these random digits from a random number table and places a selected digit at each of the addressable locations in the truth table.

The sequence controller 34 subsequently, in Step 13, examines the numerical value stored in the counter 32. If the counter is not equal to three, as seen by the flow chart, the counter 32, in Step 14, is incremented by one. Then the sequence controller 34 causes the machine to return to Step 8, shifting the card number $C_1$–$C_{16}$ in the shift register 25 by three digit positions so that new card number bits will be available for sampling by the matrix switch 27. At this point in time, the system in FIG. 1 has been reset so an additional pair of truth table addresses, namely, the second set $S_3$ and $S_4$, can be generated in accordance with the sequence already described to produce the second transform digit $T_2$.

As indicated in the flow chart shown in FIG. 2, the system in FIG. 1, under the control of the sequence controller 34, continues to generate transform numbers and to store these transformed numbers in the transformed number register 17 until the counter 32 reaches a value of three as determined in Step 13. At this point in time, the transformed number register 17 has a digit stored in each of the digit positions labeled $T_1'$, $T_2'$, $T_3'$, and $T_4'$. Each of these digits $T_1$, $T_2$, $T_3$ and $T_4$ are random number digits from the four sequentially addressed truth table locations. The sequence controller 34, in Step 15, causes the memorized number digits $M_1$ – $M_4$ in the memorized number register 16 to be compared by compare circuit 18, with the transformed number digits $T_1$–$T_4$ from the transformed number register 17. For most operations, the comparing circuit 18 detects the identity between the transformed number digits $T_1$–$T_4$ and the memorized number digits $M_1$–$M_4$ and comprises a plurality of EXCLUSIVE OR gates for comparing each bit position $M_1'$–$M_4'$ and $T_1'$–$T_4'$ in these two registers. Those skilled in the art will recognize that the comparison need not be an exact comparison of the data $T_1$–$T_4$ in the transformed number register 17 and the memorized number $M_1$–$M_4$ in register 16. For example, the memorized number $M_1$–$M_4$ may be added to the transformed number $T_1$–$T_4$ to form a new number. If the new number equals a predetermined fixed number, the card holder is deemed verified. Whatever approach is taken, however, when the proper memorized number $M_1$–$M_4$ has been inserted into the system on the keyboard 14 and the proper credit card 10 has also been inserted into the reader 13 at the same time, and the verification system produces a signal indicating a favorable comparison, it is assumed that the owner or an authorized person is seeking to use the system and the card holder is verified.

The sequence controller 34 is a source of clocking signals which are delivered to the verification system elements by a distribution network 34' (FIG. 1). The sequence controller 34, as indicated, controls the sequence in which the system elements perform their functions by producing a sequence of control pulses. Sequence controllers are well known in the art and may take on many forms including read-only storage controls, counter-decoder controls and the like. Read-only storage devices of the type used in computers and other controlled apparatus are ideally suited for application in verification systems of the type described. Such read-only storage devices produce clocking signals in their proper sequence to activate the system elements. For example, a read-only storage would produce at the outset of the verification method the control signals necessary to gate the read card number from the card reader 13 into the shift register 25. The read-only storage would also generate the necessary gating signals to permit the memorized number entered on the keyboard to be stored in register 16. After these two operations are complete, the read-only storage would produce signals to reset the counter 32 and the X/Y register 37. The read-only storage would continue to produce gating signals in sequence to produce the functions in the sequence defined by the flow chart in FIG. 2.

The matrix switch itself, in a preferred embodiment shown in part in FIG. 3, comprises five switch decks A, B, C, D and E (only one switch deck A being shown), each switch deck having four switches. Each switch in each switch deck, such as switch 50, may actually take the form of an electronic switch, a rotary switch, or even a plugboard for connecting one of 16 inputs, such as input terminals 51, 52, 53, 54 and 55, to the output terminal 56. Each switch 50 has 16 input terminals, although, for ease of understanding, some switch terminals are not shown in FIG. 3. Each switch input terminal is wired to one binary bit position in the shift register 25. For example, the input terminals 51, 52, 53, 54 and 55 are connected by wires to the high order (8's) bit position for each card number digit $C_1$, $C_2$, $C_3$, $C_4$, and $C_5$ in the shift register 25. The remaining input terminals for the switch 50, although not shown, are wired to the remaining high order bit positions of the remaining card number digit positions in the shift register 25. Consequently, each of the high order bit positions for each card number digit in the shift register 25 is wired to one input terminal of the switch 50. The output 56 of the switch 50 will have a signal thereon representing the value of one high order bit position of one card number digit stored in the shift register 25. The output 56 of the switch 50 is labeled $A_8$ to indicate that it represents the 8's bit position output for the A switch deck. Each of the remaining switch decks B, C, D and E has an 8's position switch similar to switch 50 with input terminals wired to each 8's bit position of the shift register for producing an output labeled $B_8$, $C_8$, $D_8$ and $E_8$, each having signals thereon from one high order (8's) bit position from one card number digit stored in the shift register 25.

Each switch deck also has a 4's, 2's and 1's position switch, each with 16 input terminals and one output terminal. Each of the 16 input terminals is wired to one bit position in each digit position in the shift register corresponding to the bit position of the switch. The switch 58, for example, is labeled $A_4$ and has each of its 16 input terminals wired to a 4's bit position in each of the 16 card number digit positions so that the signal output $A_4$ will be the same as the 4's bit position for the selected card number digit on the switch 58.

Each of the five switch decks A, B, C, D and E produce a 4 bit binary output digit comprising an 8's bit, a 4's bit, a 2's bit and a 1's bit. For example, the A switch deck is shown in FIG. 3 with an $A_8$, $A_4$, $A_2$ and $A_1$ output bit position. Switch 50 controls the $A_8$ output bit. When this switch 50 is set to its 5th position, the input terminal 55 is connected to the output terminal 56. Since the input terminal 55 is wired to the 8's bit position of the $C_5$ card number digit, the 8's bit position for the $C_5$ card number digit is wired to the $A_8$ output bit for the A switching deck. For the assumed data in the shift register 25, the $A_8$ output will have a signal thereon representing a binary one. The switches 58, 59 and 60 are set to their 3rd, 1st and 4th positions, respectively, so the outputs $A_4$, $A_2$ and $A_1$ each have signals thereon representing a binary one, for the card data shown in the shift register 25.

Each of the four switches in the five switch decks A–E is settable to one of 16 positions. The actual switch settings are established by the bank or other authority using the verification system with a cash dispenser or the like. The switch settings are preferably selected from a random number table so that the truth table address generation cannot easily be compromised by an unauthorized user. Random setting of the switches is also desirable to ensure that the card number bits for forming the truth table addresses are selected at random. Spectral density means the probability that a given digit will take on a possible value assignable to that digit. Flat spectral density means that the probability of a given digit taking any assignable digit value is equal for all assignable digit values.

It has been discovered, and it can be verified by statistical analysis, that a random set of card numbers having a flat spectral density will produce at the switch output a set of four bit binary digits having a flat spectral distribution for digits having values from 0 to 7 and a spectral density for the digits having values between 8 and 15 which is significantly lower than for those digits with values between 0 and 7. The reason for this deviation is that there is only a 20 percent chance that the original BCD data in register 25 will have a binary 1 in any selected 8's bit position. A bit in this position is required, however, in order to produce an output from any switching deck having a value between 8 and 15. Indeed, the probability that the switch deck output digit will have a value between 8 and 15 is 20 percent.

Since switch deck output digits having values between 10 and 15 are possible, such digits must be eliminated before they enter the decimal adder. The number limiting circuit 28 provided between each switch deck and the adder input limits the maximum value of numbers entering the adder to 9. This is accomplished by a simple circuit. Whenever the 8's bit position output of any switch deck is a one, the number limiting circuit forces the 4's and 2's bit positions for that switch deck to a zero. Consequently, when a switch deck output has a value between 8 and 15, the output of the connected number limiting circuit is either an 8 or a 9.

An advantage achieved by the number limiting circuit 28 is that the spectral density of the digits applied to the input of the adder is flat. Since the input to the number limiting circuit has values between 8 and 15 for 20 percent of the time, the output will have a value of 8 or 9 for 20 percent of the time. Indeed, statistical analysis indicates that there is a 10 percent chance that the digit appearing at the number limiting circuit output will have any one assignable value between 0 and 9.

An actual number limiting circuit is shown in FIG. 4. The particular number limiter is connected to the A switch deck, with the switches symbolically shown as $A_8$, $A_4$, $A_2$, and $A_1$.

A wire 61 connects the $A_8$ switch deck output terminal with the $A_8'$ number limiting circuit output terminal. The $A_8$ switch deck output terminal is also wired to the input of an inverter circuit 62. The output of the inverter circuit 62 is connected by a wire 63 to the input terminals of two AND circuits 64 and 65. The second input for these AND circuits 64 and 65 are respectively wired to the $A_4$ and $A_2$ output terminals of the A switch deck. The outputs of these AND circuits 64 and 65 form the $A_4'$ and $A_2'$ number limiting circuit outputs. The $A_1'$ output for the number limiting circuit is identical to the $A_1$ output of the A switch deck.

The number limiting circuit shown in FIG. 4 operates to limit the maximum value for the 4 bit digit output at terminals $A_8'$, $A_4'$, $A_2'$, $A_1'$. Whenever the $A_8'$ output terminal has a signal thereon representing a binary one, the inverter 62 is operative to produce on wire 63 a signal representing a binary zero. This signal on the wire 63 will condition the AND circuits 64 and 65 so their output at terminals $A_4'$ and $A_2'$ will have signals thereon representing a binary zero. Indeed, whenever the signal on the $A_8'$ output terminal of the number limiting circuit represents a binary one, the signals on the $A_4'$ and $A_2'$ output terminals are forced to represent a binary zero. As a result, no matter what the four bit binary number generated by a switch deck may be, a number limiting circuit of the type described will operate to limit the maximum value of the output digit therefrom to a nine. A statistical analysis of the number limiting circuit output shows that the spectral density for each possible value assignable thereto is the same as for each other possible value. The number limiting circuit, therefore, is operative to produce an output with a flat spectral density.

From the foregoing analysis, it is clear that number limiting circuits of the type shown in FIG. 4 when combined with switch decks of the type described do not degrade the spectral density for the digits output therefrom and applied to the adder input. In fact, under certain circumstances, the spectral density may be somewhat improved. For example, assuming that the spectral density for a 9 in the set of card numbers assigned is 0, i.e., there are no assigned card numbers with a 9 thereon, then a spectral enhancement will occur because both 8's and 9's can be generated by the number limiting circuitry shown in FIG. 4. This result is achieved by the number limiting circuits in the following way. Whenever the 8's position switch of one switch deck is connected to a card digit with a value of 8, the number limiting circuit can still output a 9 because the 1's position for the switch deck is independently selected and may be connected to the 1's bit position of another card digit having a 1 therein.

As was pointed out in connection with FIG. 1, the adder 30 is preferably a parallel adder with five decimal digits received from the number limiting circuitry applied to its input along with signals representing the setting of the counter 32. The reason for having this counter input to the adder is to prevent an unauthorized person from determining the contents of certain truth table locations. For example, if the counter were not present and a card number with every digit position the same is inserted into the shift register 25, the output for each digit position in the transformed number register 17 will be identical because the matrix switch, the number limiting circuit, the adder and the addressing circuitry for the truth table will generate identical addresses each time the truth table is addressed. This situation is undesirable because an individual could determine the contents of four truth table locations by trial and error in a relatively short time. This would reduce the system security significantly. To overcome this problem, the counter is added to the data generated by the matrix switch to force successive addresses for accessing the truth table to be different when the input data in register 25 comprises a number with every digit identical. These differing addresses will cause several locations in the truth table to be addressed and placed in different digit positions of the transformed number register 17.

It is clear from the foregoing description that the objects set forth at the outset of this application have been achieved by the apparatus and method of operation described above. It is also clear to those of skill in the art that the specific structural implementation described above is merely representative of one preferred embodiment and that numerous other approaches may be chosen. For example, the addition operation described above is preferably a parallel addition. That is, the output representing the sum of the five input digits from the switching matrix and number limiting circuitry and the input from the counter is generated at one time. It is equally acceptable for circuitry to be devised so that the output from the first switching deck is added to the output of the second switching deck to produce a first partial sum. This partial sum would then be added to the third switch deck output and so forth until the complete sum was generated. This sum would then comprise either an X or Y address for the truth table.

It is also clear that the adder need not be a truncating adder if the truth table is large enough to accommodate all the addresses generated without truncation. Indeed, the adder need not be a decimal adder. If the adder were a binary adder which ignores carries and produces 16 possible digit values, a truth table with 256 locations would be necessary to accommodate all possible combinations of X and Y addresses. By making the adder a binary adder, a further advantage is achieved because the number limiting circuits are no longer necessary to limit the adder input digits to a maximum of 9.

A further possible modification to the system described in FIG. 1 is one which would provide a serial rather than parallel comparison of the transformed number digits with the entered memorized number digits. The circuitry in FIG. 1 performs a parallel comparison of the digits in register 16 with the digits in register 17. It is conceivable that some saving may be realized by providing a serial digit comparison which, because of the speed of the digital circuitry, could operate as the customer enters his memorized number on the keyboard 14.

All of the above and other modifications readily apparent to those skilled in the art will produce a verification system which is particularly suited to the security requirements of cash dispensing and the like. Since the matrix switch settings are controlled by the system owner, the transformation scheme, algorithm, for converting the card data into address data for the truth table is changeable and not determinable without actually breaking into the machine or somehow obtaining a listing of the switch settings. It is also difficult to determine the switch settings because there are, in the preferred embodiment, 20 switches, each switch having 16 possible settings which are selected preferably from a random number table. This means that an unauthorized person knowing the algorithm for transforming card numbers into addresses for the truth table will be unable to determine the actual addresses generated from the numbers on a given card because the switch settings are unknown. Furthermore, by providing a system of the character described, if the switch setting somehow becomes known to an unauthorized person, he still cannot readily determine the truth table output for any given input because the contents of the truth table are random and not determinable. It is this independence and indeterminability associated with the truth table output that provides the system security achieved by this invention.

It will be recognized by those skilled in the art that the verification system and method described has application in apparatus other than cash dispensers. For example, a verification system of the type described can be used in data processing systems where security of files is necessary. In such systems, a number, like a file protect key would be associated with the system data files. This number would be used like a card number which is transformed within the computer and compared with a number entered by the programmer seeking access to the given file. This programmer-entered number would correspond to the customer-memorized number of the system described. If the programmer number corresponded to the transformed number, the programmer would be permitted access to the secure file.

Another possible application for the verification system would be for secure communications between two different locations on a given communications network. Each communication terminal would be equipped with a number generator for generating a number corresponding to the card number. In addition, each authorized use of the communication network would be provided with a memorized number to be entered by the user seeking to communicate with a second terminal on the network. The terminal generated number and the memorized number would then be transmitted to the receiving terminal where the verification of the two numbers would occur in accordance with the verification method described. If there is a proper comparison between the memorized number and the machine generated number in accordance with the described method, communication between the two remote location terminals is permitted.

The invention has been described in connection with a system wherein the card number is written on the card in machine readable form and entered into the system automatically by inserting the card into a reader whereat the card number is read. Those skilled in the art will appreciate that automatic entry of the card number is not necessary. For example, a keyboard may be provided into which the card number is manually entered by the user, in which case the card reader may be dispensed with.

In addition to using data solely in the form of numbers as the card data and as the memorized data, alpha numeric data may be used as well as alphabetic data. The term "number" as used herein is therefore understood to include data of all types whether it be in numeric, alphabetic or alphanumeric form.

The foregoing and other applications and modifications of the present verification system will be readily apparent to those skilled in the art and can be made without departing from the spirit and scope of the invention as defined in the following claims.

What is claimed is:

1. A verification system for determining whether a person is authorized to use a connected system, the verification system comprising in combination:

means for reading a multi-digit card number from a card carried by the person seeking to use the connected system, each digit having multiple bits;

means for entering and storing a memorized multi-digit number, the memorized number being entered by the person possessing the card placed in said reading means;

a storage means comprising a plurality of addressable storage locations, each storing at least one digit, said storage means responsive to successive storage addresses to produce at a storage means output successive transformed number digits from the successively addressed storage locations;

address generation means responsive to said reader to successively logically derive storage addresses from successive arbitrarily selected bits of said multi-digit read card number, each said derived address being logically related to said arbitrarily selected bits of said read card number;

comparison means for comparing all said successively derived transformed number digits with said stored multi-digit memorized number, a favorable comparison of these numbers being operative to permit the person to use the connected system, whereby a verification system is provided with enhanced security that substantially eliminates authorized system use.

2. A verification system for determining whether a person is authorized to use a connected system, the verification system comprising in combination:

means for reading a multi-digit card number from a card carried by a person seeking to use the connected system, each digit having multiple bits;

shift register means responsive to said card reading means for storing the read multi-digit card number, said shift register being responsive to a shift signal to shift the data stored therein by a predetermined amount;

means for entering and storing a memorized multi-digit number, the memorized multi-digit number being entered by the person possessing the card placed in said reading means;

a storage means comprising a plurality of addressable storage locations each for storing a digit therein, said storage means for producing at a storage means output the digit stored at the storage location addressed, said storage means output comprising a transformed number digit;

a matrix switch means responsive to said reader means for arbitrarily selecting bits of said multi-digit read card number to form a plurality of digits each being arbitrarily related to the digits of the multi-digit card number;

adder means responsive to said matrix switch to add said plurality of digits to form storage addresses;

transformed number register means, responsive to said storage means output, to store a plurality of transformed number digits;

control means for successively producing said shift signal for shifting the card number stored in said shift register by said predetermined amount to permit said matrix switch and said adder means to form successively a plurality of different storage means addresses and also operative to successively store each transformed number digit in said transformed number register, one transformed number digit being stored for each successive storage means address produced; and comparison means responsive to said transformed number register and said stored memorized number for comparing said transformed number digits with said memorized multi-digit number, a favorable comparison of these digits being operative to permit the person possessing the read card to use the connected system, whereby a verification system is provided with enhanced security that substantially eliminates authorized system use.

3. The verification system in claim 2 additionally including a number limiting circuit connected between said matrix switch and said adder means to convert said plurality of digits from said matrix switch into a plurality of binary-coded-decimal digits, said binary-coded-decimal digits being added by said adder means.

4. The verification system in claim 3 additionally including a counter means for counting the number of times said storage means is addressed, and providing an output correlated to said count, said counter means output being added by said adder means to modify the addresses generated thereby and prevent multiple addressing of the same storage location when every card number digit is identical.

5. A verification method for determining whether a person is authorized to use a connected system, the method comprising the steps of:

a. reading a multi-digit card number, each digit with a plurality of bits, from a card carried by the person seeking to use the connected system;

b. storing a memorized multi-digit number entered by the person seeking to use the connected system;

c. producing logically a plurality of storage addresses from arbitrarily selected bits of said read card multi-digit number;

d. accessing, with each said storage address, a storage means having digits stored at each addressable location therein, to produce at its output a transformed number digit each time said storage means is addressed, all accessed transformed number digits comprising a transformed number; and e. comparing said transformed number with said memorized number, a favorable comparison of these numbers being operative to permit the person to use the connected system.

6. The verification method in claim 5 wherein said storage address producing step includes:

arbitrarily selecting a plurality of bits from said read card number to form a plurality of digits; and adding said plurality of digits to form a storage address.

7. The method of claim 6 including the step of limiting said plurality of digits to produce only binary-coded-decimal digits which are added in said adding step.

8. The method of claim 5 wherein:

said storage address producing step includes the steps of:

a. arbitrarily selecting bits from said read card number to form a plurality of digits;

b. adding said plurality of digits to form a first partial storage address;

c. arbitrarily selecting a different set of bits from said read card number to form a second plurality of digits;

d. adding said second plurality of digits to form a second partial storage address; and said accessing step includes addressing said storage means with both said first and second partial addresses to produce at the output thereof said transformed number digit stored at a location defined by both said partial addresses.

9. A verification method of determining whether a person is authorized to use a connected system, the method comprising the steps of:

a. reading card number digits from a card carried by a person seeking to use a connected system and storing said digits in a shift register;

b. storing a memorized multi-digit number entered by the person seeking to use the connected system;

c. arbitrarily selecting bits from the shift register to form a plurality of digits;

d. adding the plurality of digits to form a first part of a storage means address;

e. shifting the data in the shift register by at least one digit position;

f. repeating steps (c) and (d) to form a second part of a storage means address;

g. addressing a storage means with the storage means address formed by the first and second parts to obtain a random transformed number digit from the addressed storage means location;

h. storing the random transformed number digit obtained from the storage means;

i. shifting the data in the shift register by at least one digit position;

j. repeating steps (e) through (i) one less time than there are digits in the memorized number to form the remaining digits of the transformed number; and k. comparing all of the digits of the transformed number with the digits of the memorized number, a favorable comparison of these numbers being operative to permit the person to use the connected system.

10. A verification system for determining whether a person is authorized to use a connected system, the verification system comprising in combination:

means for reading a multi-digit card number, each digit having multiple bits, from a card carried by the person seeking to use the connected system;

means for entering and storing a memorized multi-digit number, the memorized number being entered by the person possessing the card placed in said reading means;

a storage means comprising a plurality of addressable storage locations each for storing at least one digit, said storage means responsive to storage addresses to produce at a storage means output at least one transformed number digit from the storage location addressed;

a sampling means for arbitrarily selecting bits of said multi-digit read card number to form a plurality of arbitrarily formed multi-bit digits with each formed digit being mathematically and logically unrelated to the digits of said multi-digit read card number;

address forming means responsive to said arbitrarily formed digits output from said sampling means to form storage addresses;

control means operative to control the system to successively provide, at the output of said storage means, successive transformed number digits from addressed storage locations all said transformed number digits comprising a transformed number; and comparison means for comparing said transformed number digits with said stored multi-digit memorized number, a favorable comparison of these numbers being operative to permit the person to use the connected system.

* * * * *

UNITED STATES PATENT OFFICE
CERTIFICATE OF CORRECTION

Patent No. 3,794,813           Dated February 26, 1974

Inventor(s) William L. Spetz

It is certified that error appears in the above-identified patent and that said Letters Patent are hereby corrected as shown below:

Column 16, lines 47, 48 the word "authorized" should read --unauthorized--.

Column 17, line 31, the word "authorized" should read --unauthorized--.

Signed and sealed this 8th day of October 1974.

(SEAL)
Attest:

McCOY M. GIBSON JR.           C. MARSHALL DANN
Attesting Officer               Commissioner of Patents